United States Patent [19]

Boje

[11] 4,177,484
[45] Dec. 4, 1979

[54] LARGE SCREEN TELEVISION

[75] Inventor: Daniel Q. Boje, Palisades Park, N.J.

[73] Assignee: Agar International Ltd., Englewood Cliffs, N.J.

[21] Appl. No.: 797,464

[22] Filed: May 16, 1977

[51] Int. Cl.² .......................... H04N 5/64; H04N 5/74
[52] U.S. Cl. .................................... 358/254; 358/237
[58] Field of Search ............ 358/254, 237, 238, 239, 358/248, 249; 353/119; 312/7 TV; D6/167, 168; D14/77, 79-84

[56] References Cited

U.S. PATENT DOCUMENTS

| | | | |
|---|---|---|---|
| 2,438,256 | 3/1948 | Stein | 358/254 |
| 2,596,710 | 5/1952 | Moricco et al. | 358/254 |
| 2,789,158 | 4/1957 | Livingston | 358/254 |
| 3,536,832 | 10/1970 | Zipse et al. | 358/249 |
| 3,800,085 | 3/1974 | Ambats et al. | 358/237 |
| 3,922,079 | 11/1975 | Astero | 353/119 |
| 3,943,282 | 3/1976 | Muntz | 358/238 |

Primary Examiner—Robert L. Richardson
Assistant Examiner—Joseph A. Orsino, Jr.
Attorney, Agent, or Firm—Friedman, Goodman & Teitelbaum

[57] ABSTRACT

A large screen television system comprising two sections which are interconnected at their adjacent ends to define a substantially L-shaped housing configuration. The lower section is an elongated container with a television set supported near the bottom of the container having a lens assembly positioned on top of the television set. At the remote end of the upper section there is provided a rear projection screen. A reflective surface is angularly positioned at the interconnection between the two sections. A picture produced on the television screen is focused by the lens assembly to produce an image on the reflective surface. The image is then reflected from that surface and is projected onto the rear of the projection screen so that an enlarged image of the picture received by the television set may be viewed at a location in front of the screen.

10 Claims, 16 Drawing Figures

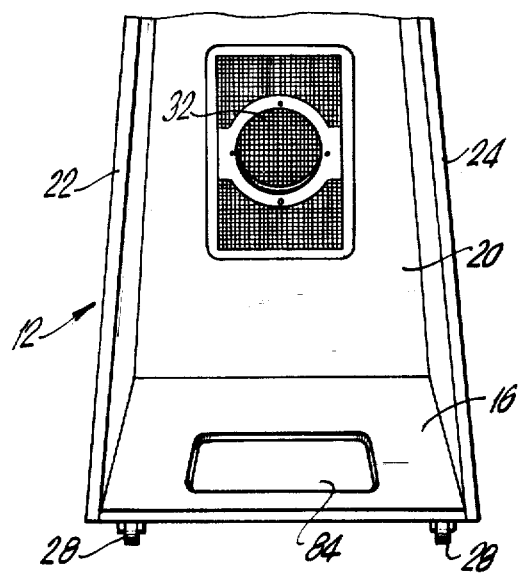
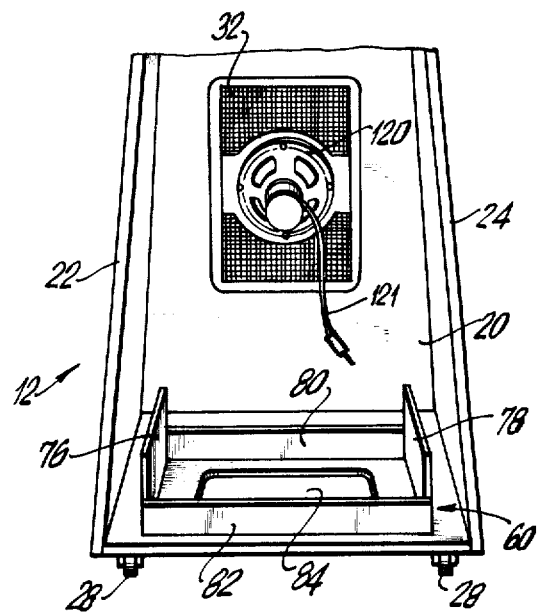
FIG.4  FIG.5
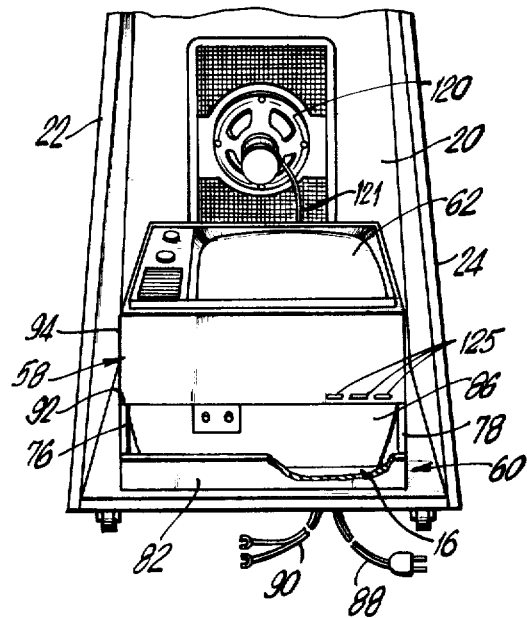
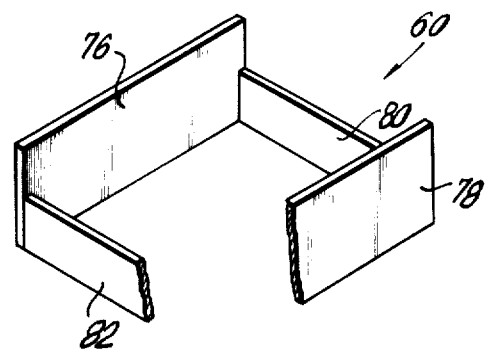
FIG.6  FIG.7

LARGE SCREEN TELEVISION

BACKGROUND OF THE INVENTION

The invention relates to a rear projection system and more particularly to a large screen television system utilizing a standard television set.

Television has become a basic part of our society and finds use not only in the home but in commercial establishments as well. For home use, the size of the television screen is generally adequate for a family to view the set in a normal sized room. However, in many commercial establishments, the television set is provided for viewing by a large number of patrons. For example, in restaurants, lounges, clubs, etc., the television set may be provided for viewing by the patrons during their visiting the commercial establishment. Additionally, in hospitals, nursing homes, and even industrial locations, a television set is frequently provided for the use of a large number of people, many of whom must view the set from various side directions and distances, and thereby the viewing area is very large.

In addition to commercial use of standard television programs, closed circuit television has become a standard instrument for many purposes. For example, in hospitals, an operation may be monitored by a large audience through the use of closed circuit television, whereby the operation is viewed on the screen of a television set. Similarly, all educational institutions, sports facilities, and security maintenance utilize closed circuit television sets.

One of the difficulties with public and large scale viewing of television screen pictures is the limited size available for the television screen. Normally, a television screen size is approximately 17" to 24", measured diagonally. While these are normally sufficient for home use, it becomes difficult in commercial or industrial establishments for people spread over a wide viewing area to clearly see the program on the television screen. In order to make the television screen bigger, a larger picture tube would be needed which would then add to the bulk and weight of the television set, as well as to the expense involved in manufacturing such a large picture tube.

As a result, when a television set must be viewed or monitored by many people, alternative solutions have been provided. For example, more than one television set is utilized and the sets are each positioned for viewing by only a small segment of the people. However, this solution again adds to the cost, since many sets must be provided for single viewing by a large audience. Other solutions have provided the placement of a magnifying lens on the front of the television screen to enlarge the picture. However, the maximum size of enlargement is limited, and when attempts are made to increase the size, loss of clarity results whereby the image becomes out of focus and difficult to view.

SUMMARY OF THE INVENTION

Accordingly, it is an object of the present invention to provide a large screen television system which avoids the aforementioned problems.

Another object of the present invention is to provide a large screen television system utilizing a standard television set, and yet provide clear magnification of the television picture.

Yet another object of the present invention is to provide a large screen television system which utilizes a standard television set and permits easy manipulation of the set to adjust the controls and tuning.

Another object of the present invention is to provide a large screen television set which is compact, and utilizes the minimum amount of space needed for proper picture projection, while maximizing the projection surface area.

A further object of the present invention is to provide a large screen television system which can be utilized in conjunction with any standard television set.

A further object of the present invention is to provide a large screen television set which permits remote control of the television controls and tuning.

Briefly, the invention provides a large screen television system which includes a housing having a projection portion and a reflection portion. The two portions are interconnected at adjacent ends thereof to define a substantially L-shaped configuration. A support means is positioned proximate the remote end of the projection portion for retaining a standard type television set. A rear projection screen means is coupled to the remote end of the reflection portion. A reflector means is located proximate the interconnection between the portions, and is angularly positioned with respect to those portions. A lens means is supported within the projection portion and focuses a picture from the screen of the television set onto the reflector means. The image from the reflector means is then projected onto the rear of the projection screen means, whereby an enlarged image of the picture received by the television set may be viewed at a location in front of the screen.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 4 is a rear perspective view of the projection portion with the rear wall removed;

FIG. 5 is a view similar to that of FIG. 4 showing the placement of the support means in the projection portion;

FIG. 6 is a view similar to that of FIG. 5 showing the inclusion of the television set;

FIG. 7 is a partially broken away perspective view of the support means in accordance with one embodiment of the present invention;

In the various figures of the drawing, like reference characters designate like parts.

DESCRIPTION OF THE PREFERRED EMBODIMENT

Figure 2:
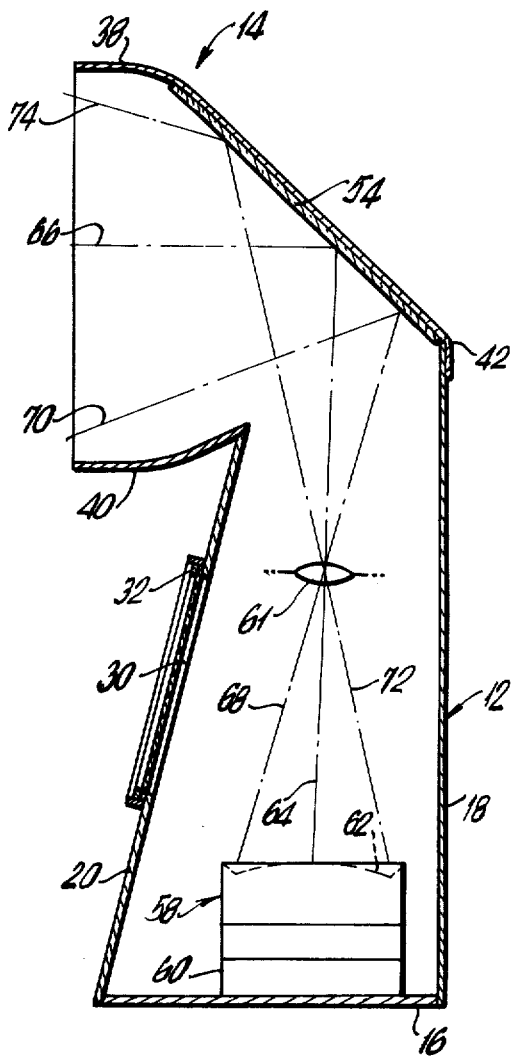
FIG. 2 is a side sectional view and schematically shows the optical arrangement of the present invention.

The large screen television system, shown generally at 10, includes a lower portion shown generally at 12 and referred to as a projection portion, and an upper portion shown generally at 14 and referred to as a reflection portion. The two portions are interconnected at adjacent ends thereof to define a substantially L-shaped configuration, as best shown in FIG. 2.

The lower projection portion includes a base wall 16 with upwardly projecting rear wall 18 and front wall 20, interconnected by side walls 22, 24. The front and rear walls are formed in a trapezoidal shape whereby the side walls converge toward each other as they extend upward from the base wall 16. A fanciful trim 26 is formed about the base, and wheels 28 are included for movement of the system. The front wall 20 is slanted rearwardly as it projects upward from the base wall 16, where the rear wall 18 extends upward in a vertical direction from the base wall.

Figure 11:
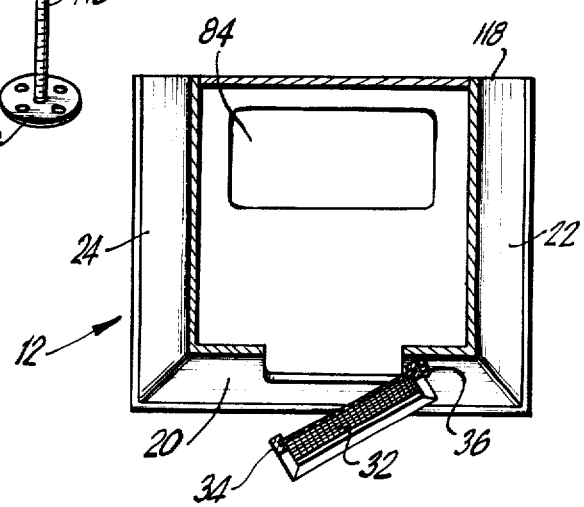
FIG. 11 shows a top plan sectional view taken transversely across FIG. 1 and passing through line 11—11.

An opening 30, approximately rectangular configuration, is formed in the front wall and a screen door 32 having a frame 34 is provided to cover the opening. The screen door 32 is provided with hinge means 36 permitting opening of the screen door to gain access inside the housing, as indicated in FIG. 11.

Figure 1:
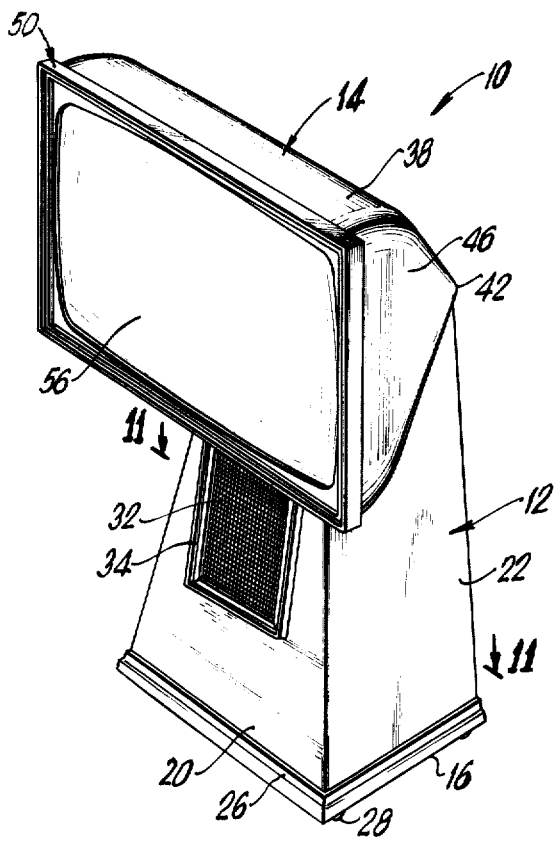
FIG. 1 is a perspective view of the large screen television system in accordance with the present invention.
Figure 3:
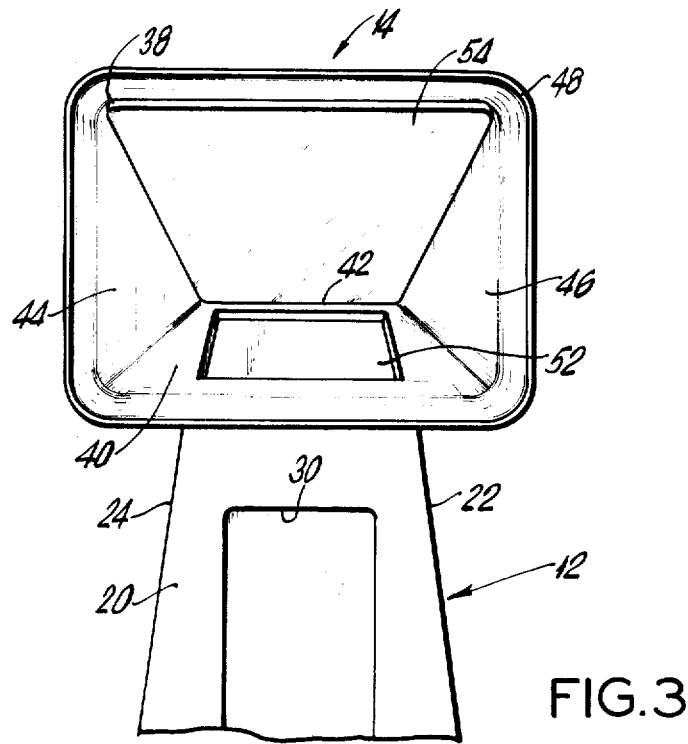
FIG. 3 is a front view of the reflection portion, with the projection screen and door removed.

The upper reflection portion 14 includes a top wall 38 and a bottom wall 40 both of substantially flat surface configuration, and which diverge away from each other from an interconnecting junction line 42 located at the rear of the system, as can best be seen in FIG. 3. Side walls 44, 46 interconnect the top and bottom walls 38, 40 and also respectively diverge away from each other from the junction line 42. As a result of the particular construction, both the top wall 38 and the bottom wall 40 form substantially trapezoidal shapes. At their remote front ends, the top and bottom walls 38, 40 project forwardly and are substantially parallel to each other, as shown at the front end in FIG. 2. Similarly, the side walls 44, 46 project forwardly at their remote front ends. A flanged edge 48, shown in FIG. 3, is thus formed at the outer remote front ends of the walls forming reflection portion 14 and a frame 50 can be mounted on the edge 48, as shown in FIG. 1.

The upper reflection portion 14 intersects and is coupled to the lower projection portion 12. Because of the downwardly slanting bottom wall 40 away from the junction line 42, the lower projection portion 12 will be intersected along an angled plane corresponding to the slant of bottom wall 40, as shown in FIG. 3. Since side walls 22, 24 of the lower projection portion 12 converge as they extend upwardly, the intersecting bottom wall 40 will form a trapezoidal configuration along the intersecting plane. A corresponding trapezoidal opening 52 is formed in the bottom wall 40 to correspond and associate with the trapezoidal top of the projection portion 12, as can best be seen in FIG. 3, the function of which being set forth below. A reflecting means, such as the reflective surface 54 is placed along an inner surface of the top wall 38 of the reflection portion. The reflective surface 54 is made in a trapezoidal shape and substantially covers almost the entire inner surface of the top wall 38. A rear projection screen 56 is retained by the frame 50 on the front of the reflection section 14.

Referring now to FIG. 2, the optical operation of the present invention will be explained. A standard television set 58 is placed within a support 60 and positioned on the base wall 16 of the lower projection portion 12. By means of a lens assembly, shown schematically at 61, the picture from the television screen or tube 62 is focused onto the reflective surface 54, which preferably is larger than the screen 62. The lens assembly 61 includes converging and diverging lenses whereby the picture will substantially occupy the entire area of the larger reflective means 54 which is shown to be angularly positioned with respect to the longitudinal axis of the projection portion 12 as well as at an angle with respect to the longitudinal axis of the reflection portion 14. As a result, the image which reflects off the reflective surface 54 will be forwardly projected onto the rear of the projection screen 56, which is larger than the reflective surface 54. Because of the distance between the television set and the reflective surface 54, as well as the distance from the reflective surface 54 to the larger screen 56, there will be an enlargement of the television picture as it appears on the rear view projection screen 56, where the picture will substantially occupy the entire area of the screen 56. The enlarged picture received may then be viewed at a location in front of the screen 56.

It should be noted, that the total length of the optical path of all beams of light from the television screen 62 to the projection screen 56 will be substantially identical. For example, the preferred length of the mean average line 64 from the television screen 62 through the lens 61 and to the reflective surface 54 is approximately 40 inches. The preferred length of the mean average line 66 from the reflective surface 54 to the screen 56 is approximately 22 inches, to provide a preferred total optical path of travel of approximately 62 inches. The optical line 68 shown at one end of the optical zone is noted to have a shorter line of path from the television screen to the reflective surface 54. However, that same line then reflects as line 70 which has a longer path of travel from the reflective surface 54 to the screen 56. Accordingly, it too will have a total optical path of travel of approximately 62 inches. At the other extreme end of the optical zone, the line 72 will have an extremely long path of travel from the television screen 62 to the reflective surface 54. However, the line 74 reflected therefrom will be a rather short line. Accordingly, the total length of the optical path of travel for that series of lines will also be approximately 62 inches. In this manner, it will be evident that since all the lines from the television set passing through the lens, onto the reflective surface, and therefrom to the screen, all travel substantially identical optical path lengths, and there will be no distortion of the picture as viewed from the screen 56. As a result, excellent quality of reproduction of the television picture will be received on the projection screen 56.

It should further be evident, especially from FIG. 3, that maximum efficiency is obtained for the size provided by means of the particular unique configuration of the housing. Specifically, by converging the side walls of the projection portion 12, and by downwardly slanting the bottom wall 40 of the reflective portion 14, the intersection between the two portions 12, 14 results in a trapezoidal configuration, as set forth above. The reflective surface 54 is also made in a trapezoidal shape whereby substantially the entire trapezoidal area of the reflective surface 54 will be utilized for the image coming through the trapezoidal opening 52 in the bottom wall 40, where the image utilizes substantially the entire opening 52. Nevertheless, when the image is forwardly reflected onto the projection screen 56, it will cover a rectangular area since the original image from the television set also covered a rectangular shape. By slanting the bottom wall 40 of the upper reflection section, maximum efficiency of size can be achieved.

The opening at the front end of the projection system is wide to accommodate a large size projection screen. At the same time, at the rear of the system, the top and bottom walls converge toward the junction line 42 and thereby occupy a minimum amount of space. Furthermore, since the reflective surface 54 must be angularly positioned, it can be placed directly against the slanting top wall 38 without having any extra unused wall space. Additionally, by inwardly directing the front wall 20 of the bottom portion 12, as can be seen in FIG. 2, there is no interference or wasted space between the downwardly slanted bottom wall 40 of the upper reflection portion 14 and the lower projection portion 12.

It should therefore be appreciated, that the converging side walls of the bottom projection portion 12, and the diverging top and bottom walls of the upper portion 14, form a unique configuration whereby a trapezoidal section is intersected by the bottom wall and a trapezoidal reflective surface is utilized. Nevertheless, rectangular pictures are provided on the front projection screen. These unique configurations provide for maximum use of space and provide for a large screen system within the smallest structure for obtaining same.

In order to support the television set in the bottom part of the projection portion 12, there is provided a cradle support 60 as best seen in FIGS. 5 and 7. The cradles is formed as a frame with two opposite sides 76, 78 being higher than the two other opposite sides 80, 82. The bottom of the entire cradle is open. Initially, as shown in FIG. 4, an opening 84 is formed in the base wall 16 of the projection portion 12. The opening is available for the protruding rear portion of a television set which can extend therethrough where the protruding portion is conventional on most television sets to house the rear end of the picture tube. The cradles 60 is positioned on the base wall 16 around the opening 84, as shown in FIG. 5, and can be secured in place by conventional fastening means. The television set 58 is placed into the cradle 60 with the screen 62 facing upwardly. The rear portion 86 of the television set passes downward into the cradle with the protruding rear portion (not shown) extending through the open bottom of the cradle 60 and into the opening 84 provided in the base wall 16. A conventional utility power plug 88 and antenna wire 90 on the back of the television set can also extend through the opening 84.

The particular cradle 60 described is provided to accommodate specific types of television sets wherein there is an inwardly extending offset 92 around the frame wall 94 of the set, and in which can fit the higher walls 76, 78 of the cradle for supporting same. The rear portion 86, except for the protruding portion thereof, rests on the base wall 16 and covers the opening 84. Of course, a separate sized cradle could be provided for other types of television sets.

Figure 8:
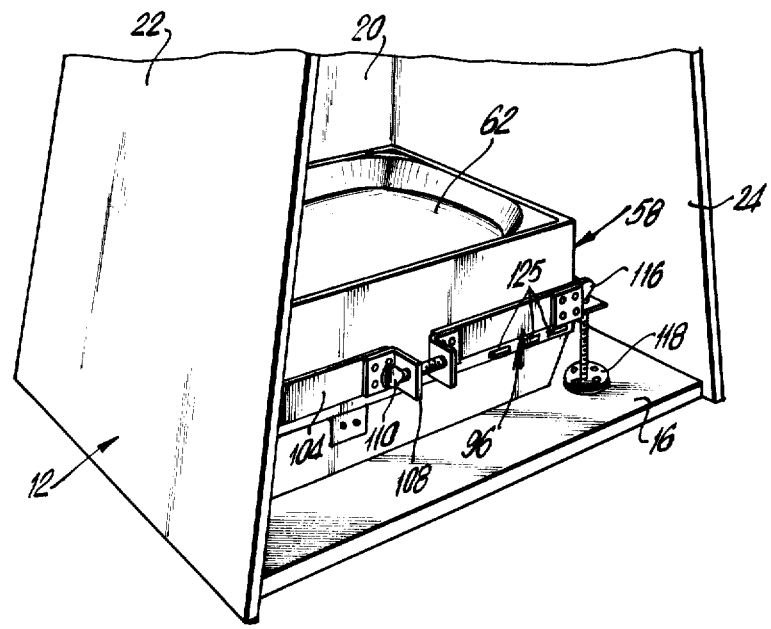
FIG. 8 is a view of part of the projection portion with a television set supported by an alternate embodiment of the support means.
Figure 10:
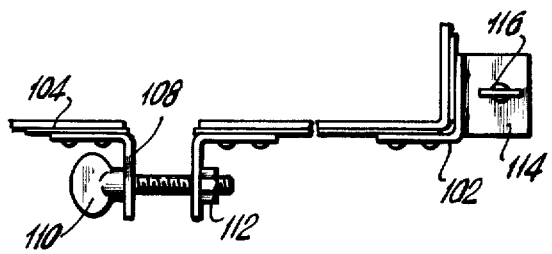
FIG. 10 shows a plan view of part of the support means shown in FIG. 9.
Figure 9:
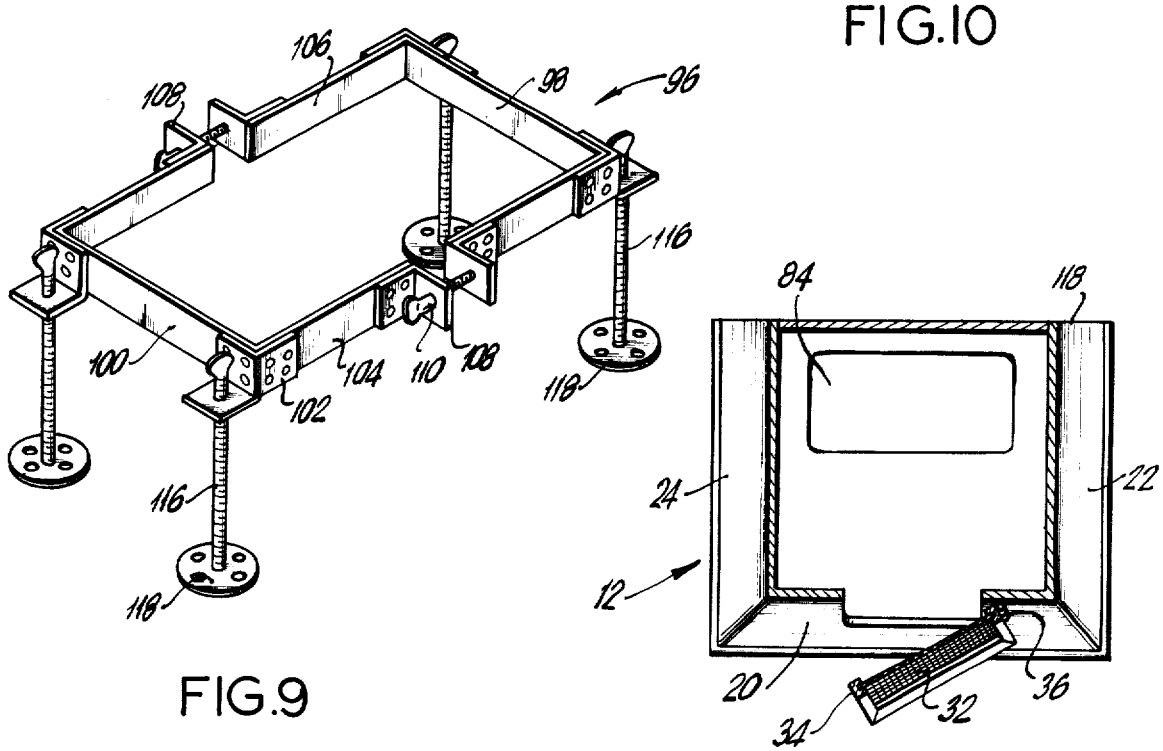
FIG. 9 shows a perspective view of the support means utilized in the embodiment shown in FIG. 8.

Alternately, as shown in FIGS. 8-10 an adjustable yoke 96 can be utilized to retain the television set in place near the bottom of the projection portion. The yoke 96 contains side bars 98, 100 interconnected by corner braces 102 to the front and rear bars 104, 106. The front and rear bars are split to provide two substantially U-shaped bar members, where abutting L-shaped members 108 are coupled to the adjoining edges of the U-shaped bar members. An adjusting pin 110 is placed through the L-shaped members. These pins 110 are locked by means of the nuts 112 to tighten together the front and rear two bars which are similarly formed. Each corner brace 102 also includes a lower outwardly extending section 114 through which passes an adjustable screw-type leg 116 having a base 118.

The television set 58 is inserted within the yoke 96 and the adjusting pins and nuts 110, 112 are tightened to secure the yoke 96 about the periphery of the television set. The set is then positioned on the base wall 16 of the projection portion 12 and the adjusting legs 116 are arranged to maintain the television set at the proper height. The hole 84 within the base wall 16 can again be utilized to receive the depending protruding rear wall of the television set as well as the utility cord and antenna wire, as set forth above. The bases 118 can be secured by conventional fastening means to the base wall 16, such as through the openings provided in each base 118.

Although the television set contains its own speaker, in order to facilitate reception of the audio portion of the television program, a large speaker 120 can be placed on the screen door 32 as shown in FIG. 5. The speaker 120 can either be connected, by conventional cord and jack 121, in parallel with the television set speaker so that both operate simultaneously or alternately, the television speaker can be disconnected and only the large speaker 120 utilized.

The system as thus far described can be especially utilized with a remote control television set. With such type sets, channel selection, sound, on-off position as well as focusing and picture adjustment can all be remotely controlled by means of a small hand held unit. As is well known, such units send a frequency signal to the television set, and upon receipt by the television set, the set adjusts itself according to the controlled signal. By means of the screen door 32, the frequency signal can easily pass into the housing to reach the television set and thereby permit easy adjustment of the channel selection, sound and proper focusing of the television set, as well as turning the set on and off. Thus, the screen 32 is utilized both as a cover for the speaker 120 to provide the audio signal out from the housing, as well as permitting a remote control signal to pass into the housing to thereby adjust the television set. At the same time, as shown in FIG. 11, the door is hinged to permit complete opening of the door to facilitate entry inside the projection portion and to adjust the television set, or make any electrical or mechanical repairs as are needed.

Figure 12:
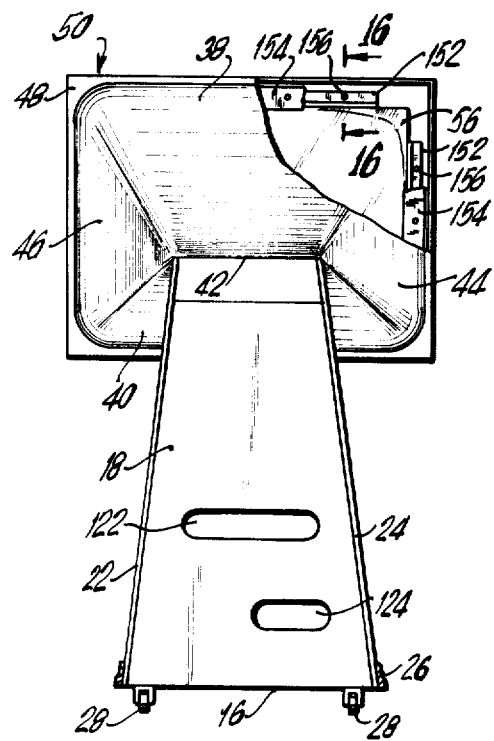
FIG. 12 is a rear view of the system of the present invention with part of the reflection portion broken away.

As is noted in FIG. 12, there are provided slots 122, 124 in the rear wall 18 of the bottom projection portion 12. One of these slots, preferably slot 122, is utilized as as an air circulation vent to permit air to enter into the bottom housing and therethrough into the television set to cool the electronic components. The other slot, preferably slot 124, can be utilized to reach in and manually adjust the controls 125 on the television set. As will be appreciated, since the television set will be placed with its top facing the rear of the housing, the usual knobs 125 for horizontal and vertical control and brightness are available at the top of the television set and are available for adjustment by reaching through the slot 124 in the rear wall and appropriately manipulating same to properly adjust the picture.

Figure 13:
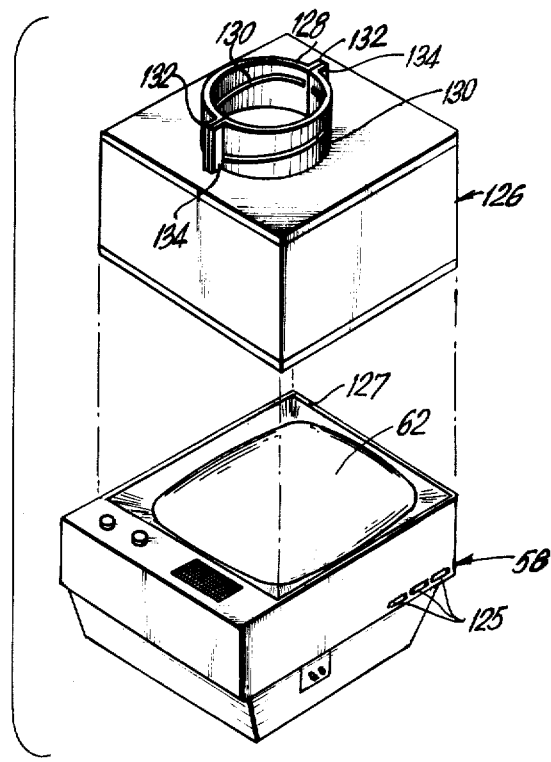
FIG. 13 is an exploded view of the lens assembly and showing its placement over the television set.
Figure 14:
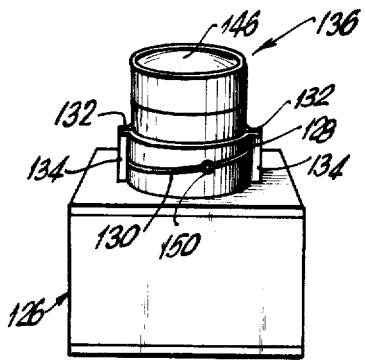
FIG. 14 is an isometric view of the lens assembly with the lens in position.
Figure 15:
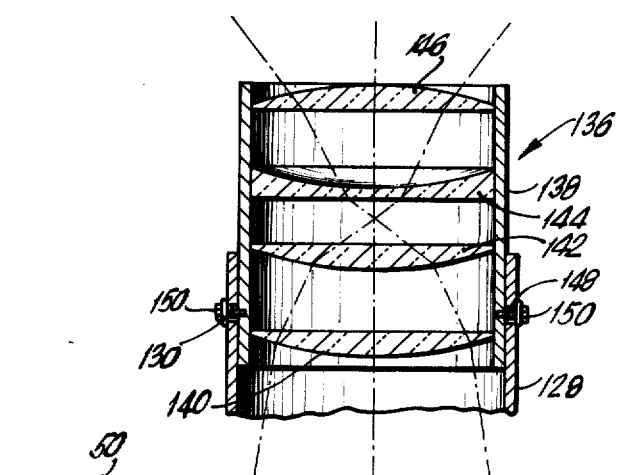
FIG. 15 is a sectional elevation view of the lens supported in the lens assembly.

Referring now to FIGS. 13-15, there will be described an embodiment of the lens assembly utilized with the present system. The lens assembly includes a box-like housing 126 which can fit within the ridge 127 provided around the screen 62 of the television set 58. Almost every television set includes such ridge therearound and the box-like member 126 can be constructed in such a manner as to fit within such ridges. Although the box shown is designed for a particular television screen size, it will be appreciated that the bottom of the box can include a downwardly depending lip with notched open portions at the corners of the box, not shown, thereby permitting the lip to fit into any ridge provided around the television screen to accommodate insertion in other television sizes and shapes.

Upwardly extending from the box 126 is a tubular member 128 containing two spherical slots 130 formed around each half of the tube. The tubular member 128 is shown formed in two sections, each containing outwardly extending wings 132, 134 which can be interconnected to secure the two halves together. Alternately, the tubular member could be made of a single piece construction. The lens assembly 136 is placed within the tubular member 128 and rotated within the spherical slots 130 to provide proper focusing adjustment of the picture from the television screen onto the reflective surface. The lens assembly 136 includes an outer tubular retainer 138 and supported transversely therein are a plurality of lenses including, in one embodiment, the Freznel lens 140, the convex lens 142, the concave lens 144, and the final Freznel lens 146. These lenses are arranged to properly focus the image from the television screen onto the reflective surface, by first converging and then diverging the optical beams to occupy the full surface area of the reflective surface.

The lens assembly 136 includes protruding positioning pins 148 which extend through the slots 130 of the tubular member 128, and further include locking means, such as the screw heads 150 disposed on the pins 148 outside the tubular member 128. The lens assembly 136 is inserted with the pins 148 extending through the spherical slots 130. The lens is then rotated and adjusted in the tubular member 128 to provide the proper focusing and picture size. The pins 148 are then locked in place in the slots 130 by the locking heads 150, and the entire lens placed appropriately in position over the television screen.

Figure 16:
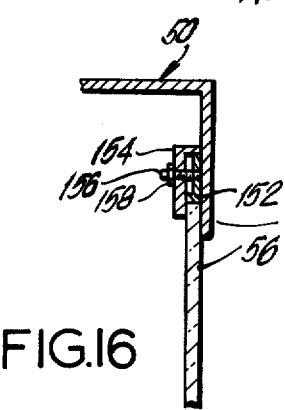
FIG. 16 is a side sectional view taken along line 16—16 of FIG. 12.

Referring now to FIGS. 12 and 16, there is shown an embodiment for mounting the rear view projection screen 56 onto the frame 50 at the front of the reflection portion 14. The screen 56 is placed against the rear of the frame 50 and held in place by L-shaped lips 152 securely positioned around the periphery of the frame to provide a guide rail around the screen 56. An inverted L-shaped member 154 is then placed over the lip 152 as well as slightly over the screen 56, and is held in place by means of a tightening screw 156 provided with a locking nut 158. With this arrangement the glass is first placed against the frame within the perimeter defined by the lip 152. Then, the L-shaped members 154 are positioned and the tightening screws and nuts are tightened to secure the members 154 in place. The tightening screws are used to hold both the L-shaped members 154 and the L-shaped lips 152 together, where the screws can be securely fixed to the lips 152 or can pass therethrough into the frame 50 to secure same to the frame 50.

In operation, the television set is mounted in the bottom of the projection portion utilizing the cradle or yoke to support the television set. The antenna and utility cord are passed through the bottom opening in the base wall of the housing. The lens assembly is then placed over the television screen and properly focused. Adjustments to the television set are then made to ensure that a clear picture appears on the projection screen. The back wall can then be mounted in a conventional manner onto the projection portion and the unit is ready for viewing. Using a remote control unit, the channel and operation of the television set can be changed externally of the housing. The slot in the rear can be used for any minor adjustments, and the screen door can be opened for any further adjustments.

In a preferred embodiment of the invention, the television set had a 17" screen, and was placed in a cradle with the lens assembly box housing having a length and width of $17\frac{1}{2}$" by 14". The cradle maintained the screen of the television set and therefore the bottom of the box housing at approximately 19" off the base wall of the projection portion. A 12" focal length lens assembly was utilized. The trapezoidal section formed at the intersection between the bottom wall of the reflection portion and the projection portion had equal opposite sides of 18" with its raised rear wall being 18" and its lowered front wall being $19\frac{1}{2}$". The reflective surface was $28\frac{1}{2}$" in length with a lowered rear edge of 20" and a raised front edge of 36". The rear projection screen was 30" high by 40" wide and was made of either plexiglass or glass material. The total path length was approximately 62" with a mean average length from the television screen to the reflected surface of 40" and a mean average length from the reflected surface to the projection screen of 22". With such embodiment, it was found that the 17" television set was enlarged to a full 50" of picture, measured diagonally. Full clarity and proper focusing was achieved and excellent results were obtained.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A large screen television system comprising:
  a housing having a projection portion and a reflection portion interconnected at adjacent ends thereof to define a substantially L-shaped configuration;
  said reflection portion including a top wall and a bottom wall interconnected by opposing side walls to define a horizontally extending compartment, said top and bottom walls diverging away from each other from a rear interconnecting junction line therebetween to provide a large front area defined by said top, bottom and side walls, said bottom wall having an opening therein;
  said projection portion including a base wall with upwardly extending rear and front walls interconnected by side walls to define a vertically elongated container, said rear, front and side walls of said container being disposed around said bottom wall opening and being interconnected to said bottom wall of said reflection portion to provide communication between said container and said compartment;

support means positioned in said container on said base wall to receive a television set for retaining the television set in position with its screen facing upwardly towards said bottom wall opening, where a top portion of the screen is disposable adjacent to said rear wall of said container, and an opposite bottom portion of the screen is disposable adjacent to said front wall of said container;

said support means including adjustable yoke means for positioning about a periphery of the television set, and legs depending from said yoke means for support thereof;

a rear projection screen disposed across said large front area of said compartment, retaining means for securing said rear projection screen to said compartment;

reflective means disposed on an inside surface of said top wall of said compartment with said reflective means and said top wall being angularly positioned with respect to said rear projection screen for said reflective means to reflect an image from the television screen to said rear projection screen;

lens means disposed within said container for focusing a picture from the television screen through said bottom wall opening onto said reflective means so that a top portion of the picture is focused onto a top portion of said reflective means, and for projecting the image of the picture from said reflective means onto a rear surface of said rear projection screen to obtain an enlarged image of the picture received by the television set which can be viewed at a location in front of said rear projection screen; and said lens means including a removable box-like member positionable on the television set to enclose the television screen, a tubular member connected to said box-like member and extending upwardly from said box-like member towards said reflective means, and a lens assembly adjustably fitting within said tubular member.

2. A large screen television system as in claim 1 and wherein said base wall of said container is provided with open means extending therethrough for accommodating a depending rear portion of the television set housing and wiring associated therewith, said side walls of said container converging towards each other in a direction away from said base wall.

3. A large screen television system as in claim 2 and wherein said top wall of said compartment defines a substantially trapezoidal configuration, said bottom wall opening in said compartment being trapezoidal in shape, and said reflective means including a substantially trapezoidal surface portion.

4. A large screen television system as in claim 1 and wherein said retaining means includes a frame member disposed on a front portion of said compartment, said frame member including lip means on an inside surface thereof for providing a peripheral restraining boundary for said rear projection screen, and locking means cooperating with said lip means for securely retaining said rear projection screen against a rear portion of said frame member.

5. A large screen television system as in claim 1 and wherein said front wall contains an opening therein, and further comprising a screen door hingedly positioned over said opening.

6. A large screen television system as in claim 5 and further comprising speaker means coupled to said screen door and adapted to be interconnected to the television set.

7. A large screen television system as in claim 1 and wherein said rear wall comprises slots for providing air circulation and for providing external access to the television set controls.

8. A large screen television system as in claim 1 and wherein a wall of said tubular member includes a helical slot, and wherein said lens assembly includes radially extending pins for passage along said helical slot thereby providing focus adjustment of said lens assembly, and locking means for retaining said lens assembly in a desired position in said tubular member.

9. A large screen television system as in claim 1 and wherein said lens assembly comprises a tube and a plurality of spaced apart lenses transversely positioned within said tube.

10. A large screen television system as in claim 1 and wherein said reflective means includes a polished metal plate.

* * * * *